United States Patent Office 2,733,662
    Patented Feb. 7, 1956

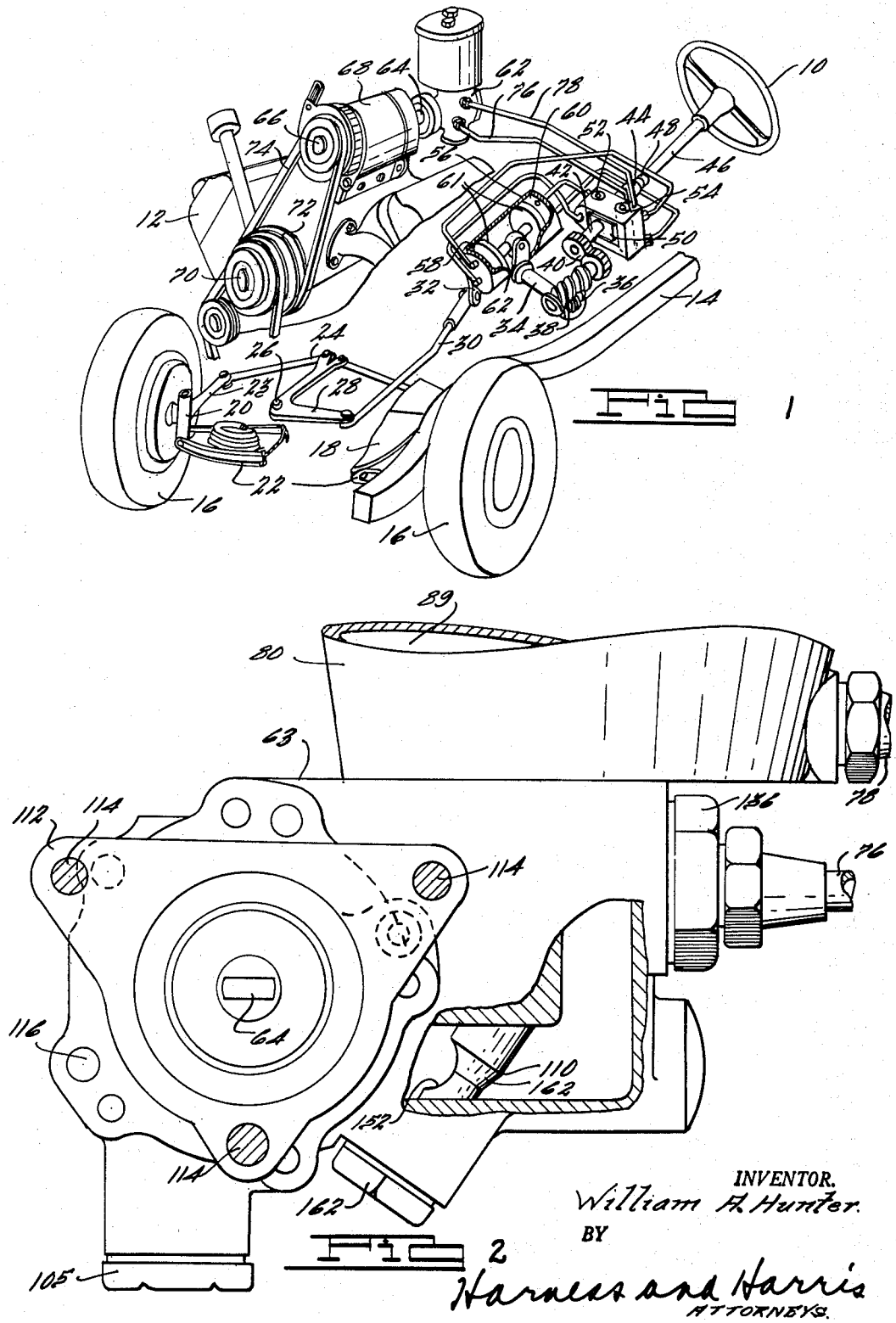

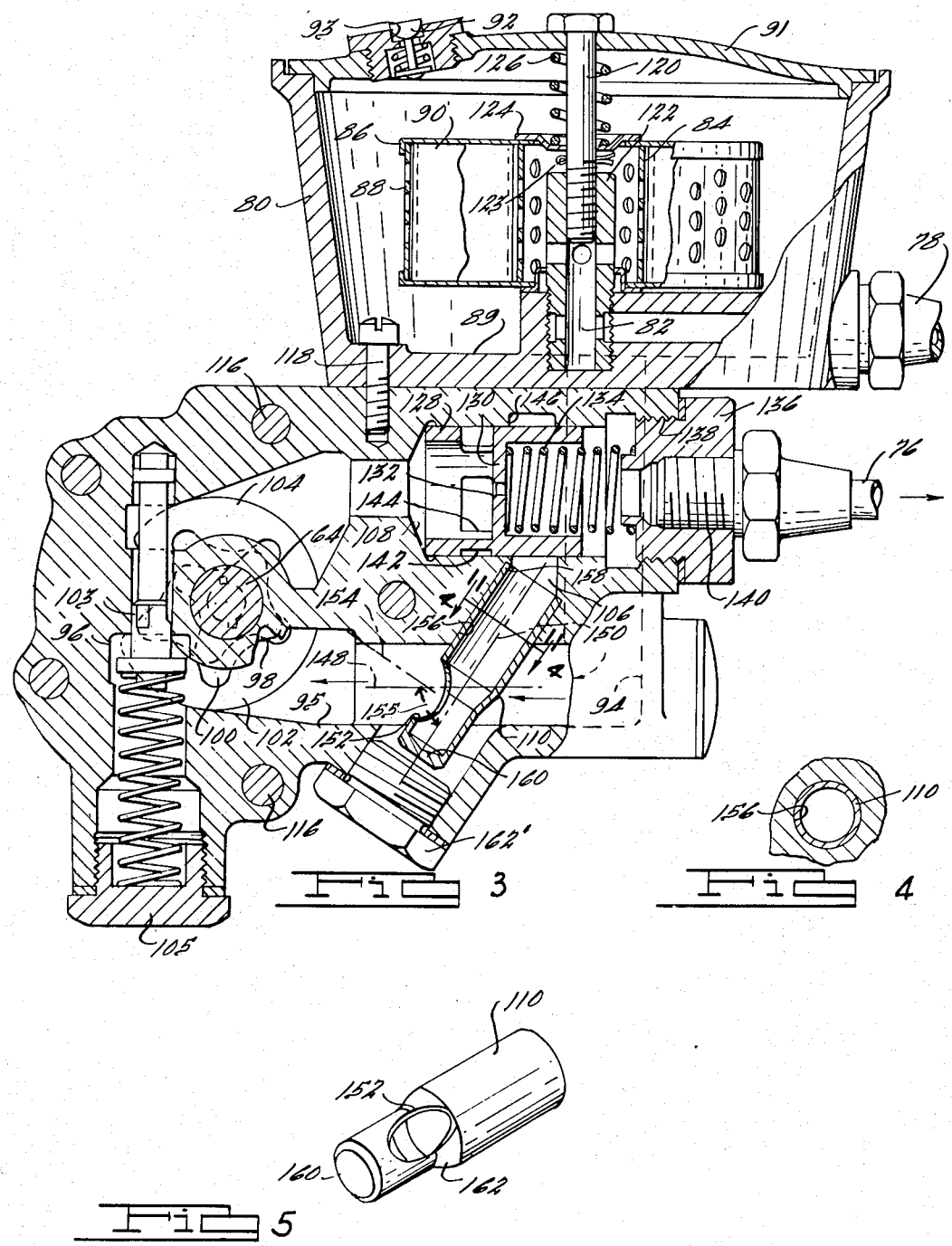

2,733,662

FLUID CIRCULATION SOURCE FOR POWER STEERING

William A. Hunter, Highland Park, Mich., assignor to Chrysler Corporation, Highland Park, Mich., a corporation of Delaware Application February 12, 1952, Serial No. 271,187

14 Claims. (Cl. 103—42)

This application relates to a portion of a pressure fluid circuit for pump-supplied power steering mechanisms and the like, and is especially directed to the fluid circulation source therefor including particularly the disposition and arrangement of the fluid-carrying conduit with respect to the pump used to generate the fluid pressure.

The components for conventional power steering mechanisms are ordinarily looked on as including means for circulating pressure fluid such as oil, glycerine or the like through a series of components including a reservoir, a power pump for generating pressure and which draws pressure fluid from the reservoir, a power cylinder or motor which actuates the steering mechanism, and distributing means for discriminately applying the pressure to the power cylinder to actuate the steering mechanism. The pressure fluid from the steering mechanism is preferably returned to the reservoir for re-circulation. The steering mechanism such as the one hereinafter described, is preferably of the "open valve" type, that is, so constructed that when the mechanism is idle there is a free passage therethrough for the pressure fluid, at least through the distributing means above such that the pump works only under a sufficient load to overcome the fluid friction of the pressure fluid in the pipes and passages through which it circulates. Thus practically all of the energy output of the useful fluid delivered by the pump is converted into useful work of steering when steering is being done and further, no energy is wasted in overcoming back pressure set up by a relief valve when the steering mechanism is idle. In mechanisms such as that to be described, the "open valve" distributing means provided between pump and motor, permits constant communication of the pump effective pressure to the motor and comprises two relatively movable sets of one or more valve elements. These two sets of valve elements have a normal or neutral relative position and when so situated, no substantial fluid pressure differential is exerted which is effective on the steered member. When, however, the sets of valve elements are so moved that the two are not in their relative neutral position, the mechanism is so constructed that pressure will be built up in the pressure fluid and forces will be differentially exerted on the fluid motor so as to cause the latter to actuate the steered member until such time as the sets of valve elements are restored to their neutral position.

For a comprehensive discussion of the specific open valve distributing means under consideration, reference may be had to the illustrated booklet Chrysler Power Steering, June 20, 1951, prepared and distributed by the Department of Technical Data and Information, Chrysler Corporation Engineering Division.

It is of the utmost importance that air pockets and that bubbles of air and other entrained gases be expelled from the fluid system as quickly as possible during operation of steering apparatus such as that described, particularly at the outset of operation after the pump has been allowed to remain standing idle for a period and bubbles have appeared and collected in the system due to leakage, dry seals, and for other reasons common to such systems; it is equally important that no cavitation occur at the pump, for the results of cavitation are very similar in character to the results of re-circulating entrained air bubbles, and in either case the operation is attendant with an objectionable amount of noise in the pump and generally throughout the system.

According to a feature of the present invention, a fluid circulation source for a power steering system is provided in which air bubbles and trapped gases are quickly and expeditiously expelled from the system and in which the tendencies toward pump cavitation are reduced to a minimum.

An object of the present invention is the provision of a conduit arrangement for a power steering pump and reservoir apparatus of the bypassed fluid type wherein the stream of bypassed fluid is introduced with a minimum of turbulence into the slower moving stream of fluid going directly from reservoir to pump, thus converting the velocity head of the bypassed fluid into a pressure head to aid in adequately filling the intake chambers of the suction side of the pump.

Another object of the invention is to provide a power steering pump and reservoir arrangement in which the fluid pumped is also filtered, but by forced filtering downstream of the pump rather than being drawn through the filter due to pump suction. Thus any pressure drop from the filtering effect can produce no pump starvation, nor the cavitation and noise usually resulting therefrom.

A further object is to provide a fluid filter, a vented reservoir, and a fluid pump in series in that order so as to permit the filtered and perhaps partially aerated fluid to collect in the vented reservoir and separate from the rising fluid froth before going to the pump and at the same time to have the full ambient atmosphere pressure (14.7 p. s. i. at sea level) effective thereon for filling the pump suction line without any intervening pressure drop. Moreover, according to a further feature, swishing and swirling noises attendant with excessive quantities of fluid circulated through the system and its associated conduit, are reduced to a minimum, particularly noises arising out of turbulence which tends to be produced in the fluid circulation source.

According to another feature of the invention, a variable speed positive displacement source of bypassed pressure is utilized in a circulating-type hydraulic steering system in a manner such that the respective circulatory and bypassed streams of hydraulic fluid are blended together and are caused quietly to fill the intake side of the positive displacement source of pressure regardless of advanced rates of speed thereof and of high rate of demand for fluid thereby.

Further features, objects and advantages will either be specifically pointed out or become apparent when for a better understanding of the invention, reference is made to the following written description taken in conjunction with the accompanying drawings in which:

Figure 1 is a perspective view of a power steered vehicle to which the invention is shown applied;

Figure 2 is an elevation of the pressure fluid source, shown partially broken away for clarity, in the steering system of the vehicle of Figure 1;

Figure 3 is an elevation similar to Figure 2 but appearing completely in section;

Figure 4 is a section of a detail taken along lines 4—4 of Figure 3; and

Figure 5 is a perspective in full of the sectioned detail of Figure 4.

In Figure 1 of the drawings, a steered vehicle illustrative of the general type to which the invention may be applied, is shown as having a steering wheel 10, a propulsion power plant 12, a body-supporting frame 14, and running gear for suspending the vehicle including a pair of steerable front wheels 16 supported from a crossmember 18 forming a portion of the vehicle frame 14. Each of the pair of wheels 16 is incorporated in a so-called independent front suspension which is shown to include a set of one or more vertically spaced arms 22, a wheel spindle and knuckle support 20 articulately connected to the outer end of the arms 22, and a steering arm 23 for each front wheel 16. Each of the steering arms 23 has an inwardly directed tie rod 24 connected thereto, and the relatively inner ends of the tie rods 24 are pivotally connected to one arm of a bellcrank 28 pivotally supported to swing about a pivot 26 fixed to the frame front crossmember 18. A rearwardly extending drag link 30 is pivotally connected at the front to the other arm of the bellcrank 28 and is supported at its rear end by a Pitman arm 32 splined to a transversely disposed rockshaft 34. It is through the rockshaft 34 and associated linkage just described, that the steering mechanism of the steered vehicle is connected to the pair of front wheels 16. The rockshaft 34 has a crank-like structure at one end incorporating a roller 36 which cooperates with a steering worm 38 journalled for rotation relative to the frame of the vehicle but constrained against longitudinal movement relative thereto.

A pair of pinions 40, one drivingly connected to the worm 38 and the other drivingly connected to an end of a lower piece 42 of a two-piece steering shaft, provides for manual operation of the rockshaft 34 in steering the front wheels 16 of the vehicle. The lower shaft piece 42 is mounted at its opposite end in a securely supported spherical bearing 44 which permits relative tilting of the shaft piece 42 with respect to the upper piece 46 of the two-piece steering shaft. The two shaft pieces 42, 46 are drivingly connected to one another by a flexible rubber coupling provided at 48. The upper steering shaft piece 46 is arranged such that when manually steered by the operator-operated steering wheel 10, it can cause the lower shaft piece 42 to tilt upwardly and downwardly with respect to the spherical bearing 44 as a center as a result of one pinion 40 attempting to climb upwardly or downwardly relative to the worm-connected pinion 40 of the pair.

The lower shaft piece 42 is journalled within a valve-operating block 50, and the block 50 in turn constitutes a bearing which moves due to the relative tilting movement of the lower shaft piece 42. A pair of substantially vertically spaced reaction valves 52 is located on opposite sides of the valve-operating block 50 so as to be controllable by the latter, and adjacent the reaction valves 52 there is located another set of substantially vertically spaced distribution valves 54 located on opposite sides of the valve-operating block 50 and likewise controlled by the latter. The reaction valves 52 and the distribution valves 54 serve a fluid motor 56 comprising a pair of drawn steel steering cylinders of which the right turn cylinder is indicated at 58, and the left turn cylinder is indicated at 60. Piping is provided which, as shown, suitably connects the upper distribution valve 54 and the lower reaction valve 52 respectively, to the right turn cylinder 58. The upper distribution valve 54 in this case supplies pressure fluid to the right turn cylinder 58, and the lower reaction valve 52 serves to control the back pressure maintained in the cylinder 58. Similarly, suitable piping is shown which connects the lower distribution valve 54 and the upper reaction valve 52 respectively, to the left turn cylinder 60, the function of the last-named distribution valve being to supply pressure fluid to the cylinder 60, and the function of the last-named reaction valve being to control the back pressure maintained therein.

The valve arrangement is of the so-called "open valve" type, it being the case that when the lower shaft piece 42 is disposed so as to cause the valve-operating block 50 to assume a neutral position, pressure fluid is being continuously circulated in a path through both distribution valves 54 through both cylinders 58, 60 respectively, and back through both reaction valves 52. The upper reaction valve 52 cooperates with the lower distribution valve 54, as previously noted, to control one of the steering cylinders, whereas the lower reaction valve 52 cooperates with the upper distribution valve 54 in controlling the pressure of the other cylinder. It follows then that when the valve-operating block 50 is caused to translate from neutral position upwardly due to upward tilting motion of the lower shaft piece 42, the reaction valve 52 for the left turn cylinder 60 is closed to build up back pressure therein, and the distribution valve 54 of the right turn cylinder 58 is closed so as to starve the right turn cylinder 58. Simultaneously, the lower reaction valve 52 is opened wider to permit the right turn cylinder 58 to drain, whereas the lower distribution valve 54 is being opened to stimulate flow to the left turn cylinder 60.

The reaction valves 52 are so arranged that when either one is moved toward closed position so as to build up a back pressure in its associated turn cylinder, the valve itself is subjected directly to the back pressure thus generated which thereupon acts in a direction to center the valves and return the manually displaced valve-operating block to neutral position. Thus to the operator of the operator-operated steering wheel 10 there is afforded a proportionate sense of feel and control over the system commonly known as hydraulic feel back.

A pair of pistons 61 is shown provided in the respective cylinders 58, 60 which responds to the differential pressure forces of the pressure fluid and each piston 61 carries a stud which engages an interposed roller carried by a crank arm 62. The crank arm 62 is splined to the rockshaft 34 and serves to give a power assist to the otherwise manual steering system. When the rockshaft 34 moves in response to the fluid actuation of the power assist pistons 61, the pinion of the pair of pinions 40, which is connected to the worm 38, rotates and tends to cause the other pinion of the pair 40 to orbit therabout and restore the tiltable shaft 42 and the valve-operating block 50 to neutral position.

In the actually constructed embodiment of the power steering apparatus selected for illustration in Figure 1, the physical travel of the valve-operating block 50 from neutral position was limited to a few thousandths of an inch by virtue of the fact that the valves 52, 54 were limited in movement to a few thousandths of an inch out of neutral position.

The power assist mechanism thus far described is operated by pressure of pressure fluid constantly supplied to the valving 52, 54. In neutral position the valves 52, 54 are partially open, and when any two valves from different pairs are opened to a relatively greater degree, the remaining two valves are closed by a corresponding amount. That is to say, when any two valves from different pairs are opened by movement of a few thousandths of an inch, the remaining two valves are closed by a corresponding movement of a few thousandths of an inch. A source of pressure (and the pressures involved may be of the order 600 to 800 p. s. i. above atmosphere at times) is indicated at 63 and is positively driven by pump shaft 64 which is flexibly coupled to a generator shaft 66 driving the rotor of a generator 68.

The propulsion power plant 12 selected for illustration in Figure 1, is a V–8 engine to which the generator 68 is mounted, and the engine includes a water pump shaft 70 which is belt-driven from the engine and has a sheave 72 keyed thereto. By means of a V-belt 74, the sheave 72 is connected to a sheave on the generator shaft 66 and thus positively drives the generator shaft 66 and the pump shaft 64 at speeds proportionate to the engine speed. Thus as the speed of the power plant 12 varies, so varies the shaft speed of the generator 68 and so also varies the shaft speed of the drive shaft 64 for the source of pressure 62. The supply pipe 76 supplies pressure fluid to the valving 52, 54 and a drain pipe 78 returns pressure fluid from the valving back to the source of pressure 62.

In Figures 2, 3, 4, and 5, the source of pressure 62 has a reservoir 80 containing a vertically disposed communication 82 centrally thereof which is connected to the drain pipe 78 returning pressure fluid to the source. The vertically disposed communication 82 has openings in the upper end thereof which communicate with a chamber formed by a perforated inner cylinder 84 cooperating with a perforated outer cylinder 88 to define a fluid filter 86. A filtering element 90 is shown within the filter 86 between cylinders and is formed of a pleated continuous length of thin-walled filter material through which all fluid must pass in progressing from the perforated inner cylinder 84 to the perforated outer cylinder 88. The reservoir 80 forms a chamber 89 to de-aerate the incoming fluid and has a cover 91 at the top thereof. The cover 91 is vented to atmosphere by a vent 93 controlled by a spring-pressed relief valve 92 for limiting the pressure in the chamber 89 to atmospheric. The reservoir 80 has at the bottom thereof a downwardly extending communication 94 which through a pump supply passage 95 supplies a positive displacement rotary pump 96. The rotary pump 96 is encased and includes a pair of rotors 98 eccentrically arranged one within the other with the inner rotor thereof being drivingly keyed to the drive shaft 64 driven by the vehicle engine 12. The inner rotor of the pair of rotors 98 has one less tooth than the number of teeth at the outer rotor and cooperates therewith to define included cavities 100 which serve during clockwise rotation of the pair of rotors 98 to trap and transfer individual quantities of pressure fluid from a pump supply port 102 to a pump pressure port 104. The pressure port 104 and the supply port 102 are interconnected by a blow-off valve passage containing a spring-pressed blow-off valve 103, the spring for the latter being preloaded for a pressure corresponding to approximately 600 lbs. per square inch pump pressure and seating on a sealed plug 105 for the pump casing.

The pressure and supply ports 104, 102 are bypassed by a bypass generally indicated at 106 and including a fluid flow director 110 and a hollow valve chamber 108. The pressure source 62 has an attaching flange 112 which receives one or more attaching bolts 114. The pump casing itself is formed of one or more parts which are held together as an integral unit by means of one or more bolts 116. The source of pressure 62 has the reservoir 80 fastened thereto by means of one or more bolts 118. A headed bolt 120 holds the reservoir cover 91 to the reservoir 80 and is threadably received at one end in an upstanding hollow member 122 which has a portion providing the central passage 82 for the reservoir 80. The bolt 120 carries a cotter pin 123 intermediate the ends of the former for aiding in assembly purposes of the reservoir and filter assembly, and slidably receives a blow-off cover 124 which seals the upper end of the chamber defined by the perforated inner cylinder 84. The blow-off cover 124 is yieldably held in place by a yieldable means 126 in the form of a coil spring which is coaxial with and surrounds the shank of the bolt 120. The upper end of the coil spring 126 seats against the underside of the cover 91. The hollow valve chamber 108, disposed in spaced relation to the pump supply conduit 95, handles the discharge flow under pressure from the pump 96 and contains a slidable valve 128 therein. The valve 128 presents a transverse wall 130 interposed in the path of the flow of fluid from the pump 96 and provided with a pre-calibrated orifice 132 therein. The transverse wall 130 is engaged by a yieldable means 134 in the form of a coil spring which thrusts against a hollow plug 136 held in place by a set of threads 138 formed in the pump casing. The plug 136 is tapped at 140 for threadably receiving a fitting for the supply pipe 76 for the power steering motor.

A circumferential groove 142 formed in the valve part 128 is intersected by one or more openings 144 in the side of the valve 128 which establish communication between the groove 142 and the interior of the valve. When the valve 128 is shifted to uncover an annular depression 146 formed in the pump casing, the groove 142 cooperates with the latter to discharge fluid through the bypass 106.

In a constructed physical embodiment of the valve mechanism selected for illustration in Figure 3, the orifice 132 was pre-calibrated to permit a fluid flow at the rate of 1½ gallons per minute, and at any flow above this rate, the resulting differential pressure causes the valve 128 to unseat and uncover the annular depression 146 so as to bypass all flow in excess of 1½ gallons per minute. The pump supply passage 95 is shown to have a longitudinal axis indicated generally at 148, and the bypass 106 is shown to have a longitudinal axis 150 forming an obtuse angle with respect to and generally intersecting the axis 148. The sleeve 110 acts as a fluid flow director and has a transverse opening 152 in the side thereof and provided with an axis 154 forming an angle with respect to the axis 150 of the bypass passage 106. The results of the angularity just described are that the stream of fluid which enters the fluid flow director 110 and is discharged through the side opening 152, executes only an acute angle of departure 155 in changing its direction of flow from that of the bypass axis 150 to the supply path axis 148, or in other words, the angled stream portions form an obtuse angle with respect to one another. The fluid flow director 110 is press-fitted at 156 into the bypass 106 and has an open upper end at 158 and a closed end at 160. The fluid flow director 110 is reduced at 162 and is of a smaller transverse dimension than is the pump supply passage 95. A plug 162' is threadably received in closely spaced juxtaposed position to the closed end 160 of the fluid flow director 110 and provides access thereto. The function of the fluid flow director 110 is to direct the relatively rapidly flowing fluid stream from the bypass into the more sluggish stream of fluid supplied through the communication 94 from the reservoir and thus effectively convert the velocity head of the bypassed fluid into a pressure head for better filling the pump cavities 100 so as to prevent starvation of the pump or cavitation therein.

In the physically constructed embodiment of the device selected for the purposes of illustration in Figures 2–5, the pump 96 was of such capacity as to provide 1½ gallons per minute of fluid flow at idling speeds of the vehicle engine 12 and by reason of the fact that the pump speeds are directly proportionate to the vehicle engine speeds, at a high rate of vehicle travel the engine and pump speeds tend to become excessive and the fluid handled by the flow director 110 reaches a considerable volume of flow. It is important at such times to have a minimum of turbulence exist at the point of blending the streams of fluid from the reservoir at 94 and from the bypass at 105 and that the blending take place with as small amount of fluid eddies as possible and with a maximum conversion of velocity head of the bypass 106 into pressure head for filling the pump cavities 100.

As herein disclosed the invention is shown in the environment of a pressure fluid system of the open valve type in which the pressure fluid is continuously being circulated not only to the distributing means, but also is being continuously circulated on past the distributing means and through the power motor. It is evident that the invention will be equally effective in pressure fluid systems of the open valve type in which there is a continuous communication maintained between the distributing means and the power motor and between the distributing means and the source of pressure but in which the circulation is effective at all times only between the distributing means and the pressure source. So also the drawing shows a hydraulic steering arrangement described in operation as a hydraulic feel back system, but indeed, it is not essential to the invention that proportional hydraulic feel-back be available to the operator and a non-proportional purely mechanical type of feel back can be provided in the system instead. The pump casing incorporates a positive displacement, eccentrically arranged pump of the rotary type, but self-evidently a positive displacement eccentrically arranged pump of the spur or helical gear type or else a vane-type pump may be equally well employed to advantage. In the claims oil, glycerine and the like liquids are not only comprehended by the term "fluid" but also other suitable fluids not necessarily in or confined to the liquid state.

Variations within the spirit and scope of the invention described are equally comprehended by the foregoing description.

I claim:

1. In a pressure fluid system including a fluid actuated device and a pump and reservoir unit, a first passage and a second fluid-filled passage in spaced relation to said first passage, rotors eccentric to one another having teeth establishing cooperation to transfer flowing through the second passage and into the first passage, a valve-controlled cross passage leading from the first passage and intersectingly crossing the second passage so as to have a portion in common with the latter, said cross passage having a control valve therefor disposed in the first passage and effective to bypass through the cross passage the flow of all fluid in the first passage in excess of a predetermined rate of flow, and a sleeve having a smaller transverse dimension than said second passage and disposed in the cross passage so as to cross the second passage, said sleeve being open at one end to receive the stream of flow of said excess fluid and having a discharge opening in the side thereof facing said rotors and being within the confines of said second passage, said side opening having an axis forming an angle with respect to the longitudinal axis of the sleeve crossing said second passage and in a manner such that said stream of flow of excess fluid effects an acute-angled change of direction in traveling through and leaving the sleeve as incident to being discharged therefrom into the fluid of the second passage and toward the rotors.

2. In a pressure fluid system including a fluid actuated device and a pump and reservoir unit for supplying fluid to the device, a first passage and a second fluid-filled passage in spaced relation to said first passage, rotors eccentric to one another having teeth establishing cooperation to transfer fluid flowing through the second passage and into the first passage, and auxiliary valve-controlled cross passage leading from the first passage and intersectingly crossing the second passage so as to have a portion in common with the latter, said cross passage having a control valve therefore disposed in the first passage and effective to bypass through the cross passage the flow of all fluid in the first passage in excess of a predetermined rate of flow, and a sleeve having a smaller transverse dimension than said second passage and disposed in the cross passage so as to cross the second passage, said sleeve being open at one end to receive the stream of flow of said excess fluid and having a discharge opening in the side thereof facing said rotors and being within the confines of said second passage and in spaced relation to all walls of said second passage, said side opening having an axis forming an angle with respect to the longitudinal axis of the sleeve in a manner such that said stream of flow of excess fluid effects an acute angled change of direction in traveling through and leaving the sleeve as incident to being discharged therefrom into the fluid of the second passage and toward the rotors.

3. In a pressure fluid system including a fluid actuated device, a pump and reservoir unit for supplying the device with fluid, comprising a first passage and a second fluid-filled supply passage in spaced relation to the first passage, a valve-controlled auxiliary cross passage leading from the first passage and intersectingly crossing the second passage so as to have a portion in common with the latter, rotors eccentric to one another having teeth establishing cooperation to transfer fluid supplied from the second passage to the first passage, said cross passage having a control valve therefor disposed in the first passage and effective to admit to the auxiliary cross passage a stream of flow of all fluid flowing in the first passage in excess of a predetermined rate of flow, and a sleeve open at one end to receive said stream of excess fluid and disposed in the cross passage so as to cross said second passage, the external surface of said sleeve being of less transverse extent than the internal surface of said second passage and having diametrically opposed regions relatively remote to and relatively accessible to said rotors, and a discharge opening in the just-named external surface region which is relatively accessible to the rotors and passing through the side of the sleeve in a manner such as to occupy the said common portion of the second and cross passages, the axis of said discharge opening and the longitudinal axis of the sleeve being at an angle to one another permitting the fluid discharged through the opening to depart toward said rotors at an obtuse angle from the stream of excess fluid in the sleeve.

4. In a pressure fluid system including a fluid actuated device, a pump and reservoir unit for supplying the device with fluid, comprising a first passage and a second fluid-filled supply passage in spaced relation to the first passage, a valve-controlled auxiliary cross passage leading from the first passage and intersectingly crossing the second passage so as to have a portion in common with the latter, rotors eccentric to one another having teeth establishing cooperation to transfer fluid supplied from the second passage to the first passage, said cross passage having a control valve therefor disposed in the first passage and effective to admit to the auxiliary cross passage a stream of flow of all fluid flowing in the first passage in excess of a predetermined rate of flow, a sleeve open at one end to receive said stream of excess fluid and disposed in the cross passage so as to cross said second passage, the external surface of said sleeve being of less transverse extent than said second passage and having diametrically opposed regions relatively remote to and relatively accessible to said rotors, and a discharge opening in the just-named external surface region which is relatively accessible to the rotors and formed in the side of the sleeve in a manner such as to occupy the said common portion of the second and cross passages, the axis of said discharge opening and the longitudinal axis of the sleeve being at an angle to one another permitting the fluid discharged through the opening to depart toward said rotors at an obtuse angle from the stream of excess fluid in the sleeve, and a plug disposed in closely spaced juxtaposition to the end of the sleeve opposite the said one end of the sleeve and effective to close the auxiliary cross passage.

5. In a pressure fluid system including a fluid actuated device, a pump and reservoir unit for supplying the device with fluid, comprising a first passage and a second fluid-filled supply passage in spaced relation to the first passage, a valve-controlled auxiliary cross passage leading from the first passage and intersectingly crossing the second passage so as to have a portion in common with the latter, rotors eccentric to one another having teeth establishing cooperation to transfer fluid supplied from the second passage to the first passage, said cross passage having a control valve therefor disposed in the first passage and effective to admit to the auxiliary cross passage, a stream of flow of all fluid flowing in the first passage in excess of a predetermined rate of flow, a sleeve open at one end to receive said stream of excess fluid and disposed in the cross passage so as to cross said second passage, the external surface of said sleeve being of less transverse extent than said second passage and having diametrically opposed regions relatively remote to and relatively accessible to said rotors, and a discharge opening in the just-named external surface region which is relatively accessible to the rotors and is formed in the side of the sleeve in a manner such as to occupy the said common portion of the second and cross passages, the axis of said discharge opening and the longitudinal axis of the sleeve being at an angle to one another permitting the fluid discharged through the opening to depart toward said rotors at an obtuse angle from the stream of excess fluid in the sleeve, said sleeve having the other end thereof closed, and a plug in closely spaced juxtaposition to the closed end of the sleeve and closing off the auxiliary cross passage.

6. In a pressure-fluid circulation system including a fluid pressure actuated device, a fluid pump and reservoir unit having pressure fluid reservoir chamber vented to the atmosphere so as to be maintained substantially at atmospheric pressure, and a passaged body having a pressure fluid receiving first passage, a fluid-filled passage in spaced relation to the first passage and having an end connected to the reservoir chamber so as to receive fluid therefrom at substantially atmospheric pressure, rotors eccentric to one another and having teeth establishing cooperation to transfer pressure fluid to the fluid-receiving first passage from the fluid-filled atmospheric-pressure passage, and a valve controlled bypass disposed between and connected to the two-said passages and being effective to introduce a rapidly flowing stream of bypassed fluid from the first passage into the fluid-filled atmospheric-pressure passage, said bypass including therein a hollow body open-ended at one end and intersectingly crossing the fluid-filled atmospheric-pressure passage and being closed at the opposite end, said hollow body having a region between the ends thereof provided with an opening aligned with said fluid-filled atmospheric-pressure passage and discharging pressure fluid thereinto in a direction accessible to said rotors.

7. In a pressure-fluid circulation system including a fluid pressure driven device, a fluid pump and reservoir unit having a pressure fluid reservoir chamber vented to the atmosphere so as to be maintained substantially at atmospheric pressure, and a passaged body having a pressure-fluid receiving first passage, a fluid-filled passage in spaced relation to the first passage and having an end connected to the reservoir chamber to receive fluid at substantially atmospheric pressure therefrom, pumping means having teeth establishing cooperation to pressurize and transfer pressure fluid to the fluid-receiving first passage from the fluid-filled atmospheric-pressure passage, and a valve controlled bypass disposed between and connected to the two-said passages and being effective to introduce a rapidly flowing stream of bypassed fluid from the first passage into the fluid-filled atmospheric-pressure passage, said bypass including therein a hollow body open-ended at one end and intersectingly crossing the fluid-filled atmospheric-pressure passage and being closed at the opposite end, said hollow body having a region between the ends thereof provided with a side opening aligned with said fluid-filled atmospheric pressure passage and discharging pressure fluid thereinto in a direction accessible to said pumping means, and a plug disposed in closely spaced juxtaposition to said closed opposite end of the hollow body and effective to close the extreme end of the bypass.

8. A fluid pressure pump assembly comprising a housing, a rotary pump mounted within said housing, a pump inlet passage means in said housing for supplying said pump with low pressure fluid, a pump outlet passage means in said housing for conducting high pressure fluid from said pump, said pump outlet passage means including a flow control valve disposed therein, a fluid bypass conduit interconnecting said passages having an axis forming an acute angle with the direction of the axis of said outlet passage means, said flow control valve being effective to deliver fluid therethrough at a rate less than a predetermined maximum value, and said bypass conduit being effective to transfer therethrough the excess fluid passing through said outlet passage means not delivered through said flow control valve.

9. A fluid pressure pump assembly comprising a housing, a rotary pump mounted within said housing, a pump inlet passage means in said housing for supplying said pump with low pressure fluid, a pump outlet passage means in said housing for conducting high pressure fluid from said pump, said pump outlet passage means including a control valve disposed therein, a fluid bypass conduit interconnecting said passages, a flow director situated within said bypass conduit, said control valve being axially slidable within said outlet passage means to allow fluid to flow through said bypass conduit, and said flow director comprising a sleeve secured within said conduit having an opening therein within said inlet passage means for delivering fluid therethrough substantially in the direction of flow of low pressure fluid through said inlet passage means.

10. A fluid pressure pump assembly comprising a housing, a rotary pump mounted within said housing, a pump inlet passage means in said housing for supplying said pump with low pressure fluid, a pump outlet passage means in said housing for conducting high pressure fluid from said pump, said pump outlet passage means including a control valve disposed therein, a fluid bypass conduit interconnecting said passages comprising a hollow structure having a longitudinal axis disposed at an acute angle with respect to the direction of fluid flow through said passages, said hollow structure including a portion intersecting said inlet passage means and having an opening therein for discharging fluid into said inlet passage means substantially in the direction of flow therethrough of low pressure inlet fluid.

11. In a pressure fluid system comprising a fluid actuated device, a fluid reservoir, fluid conduit means operatively connecting said reservoir and said fluid actuated device to provide a continuous flow of working fluid from said reservoir to said device and from said device back to said reservoir; a pump interposed in said conduit means comprising a housing, a first fluid passage means for conducting fluid to the low pressure side of said pump, a second fluid passage means for conducting fluid from the high pressure side of said pump, a control valve disposed within said second fluid passage means, a flow director interconnecting both of said passage means having a portion within said second passage means, and an aperture within said portion being substantially in alignment with the longitudinal axis of said second passage means.

12. In a pumping unit of the character described, a pump housing having therein a rotor chamber and intake and discharge ports communicating with said rotor chamber, means defining a reservoir chamber supported directly by said housing at an elevation above said rotor chamber, rotor means operable in said rotor chamber for producing a pumping action, said housing also having a valve chamber therein and intake passage means connecting said reservoir chamber with said intake port and including a by-pass passage extending from said valve chamber, valve means in said valve chamber and operable to by-pass pumped fluid from said discharge port into said by-pass passage, and flow directing means comprising an insert having a sleeve portion engaging with said by-pass passage to receive the by-passed fluid therefrom, said insert having a delivery portion extending into said intake passage means and provided with a discharge opening facing downstream with respect to the direction of fluid flow in said intake passage means.

13. In a rotary pump, a housing having therein a rotor chamber and also having intake and discharge ports communicating with said rotor chamber, rotor means operable in said rotor chamber for producing a pumping action, said housing having a first valve chamber therein communicating with said discharge port and a by-pass passage extending from said first valve chamber, said housing also having a second valve chamber therein communicating with said intake and discharge ports, volume control valve means operable in said first valve chamber and adapted to by-pass pumped fluid from said discharge port into said by-pass passage, pressure relief valve means operable in said second valve chamber for by-passing pumped fluid from said discharge port to said intake port, said housing also having intake passage means therein leading to said intake port and adapted to be supplied with intake fluid, and flow directing means comprising an insert having a sleeve portion engaging with said by-pass passage to receive the by-passed fluid therefrom, said insert having a portion extending into said intake passage means and provided with a discharge opening facing downstream with respect to the direction of fluid flow in said intake passage means.

14. In a rotary pump, a housing having therein a rotor chamber and a valve chamber and also having an intake port and a discharge port communicating with said rotor chamber, rotor means operable in said rotor chamber for producing a pumping action, said housing also having intake passage means connected with said intake port and a by-pass passage extending from said valve chamber and connected with said intake passage means, said intake passage means having substantially continuous side wall means between the connection of said by-pass passage therewith and said intake port for confining the fluid being supplied to said intake port, valve means in said valve chamber and operable to by-pass pumped fluid through said by-pass passage, and flow directing means comprising an insert having a sleeve portion engaging with said by-pass passage to receive the by-passed fluid therefrom, said insert having a portion extending into said intake passage means and provided with a discharge opening facing downstream with respect to the direction of flow of the confined intake passage fluid.

References Cited in the file of this patent
UNITED STATES PATENTS

| | | |
|---|---|---|
| 1,760,070 | Kinsella | May 27, 1930 |
| 2,219,488 | Parker | Oct. 29, 1940 |
| 2,242,807 | Austin | May 20, 1941 |
| 2,446,730 | Wemp | Aug. 10, 1948 |